Figure 1:
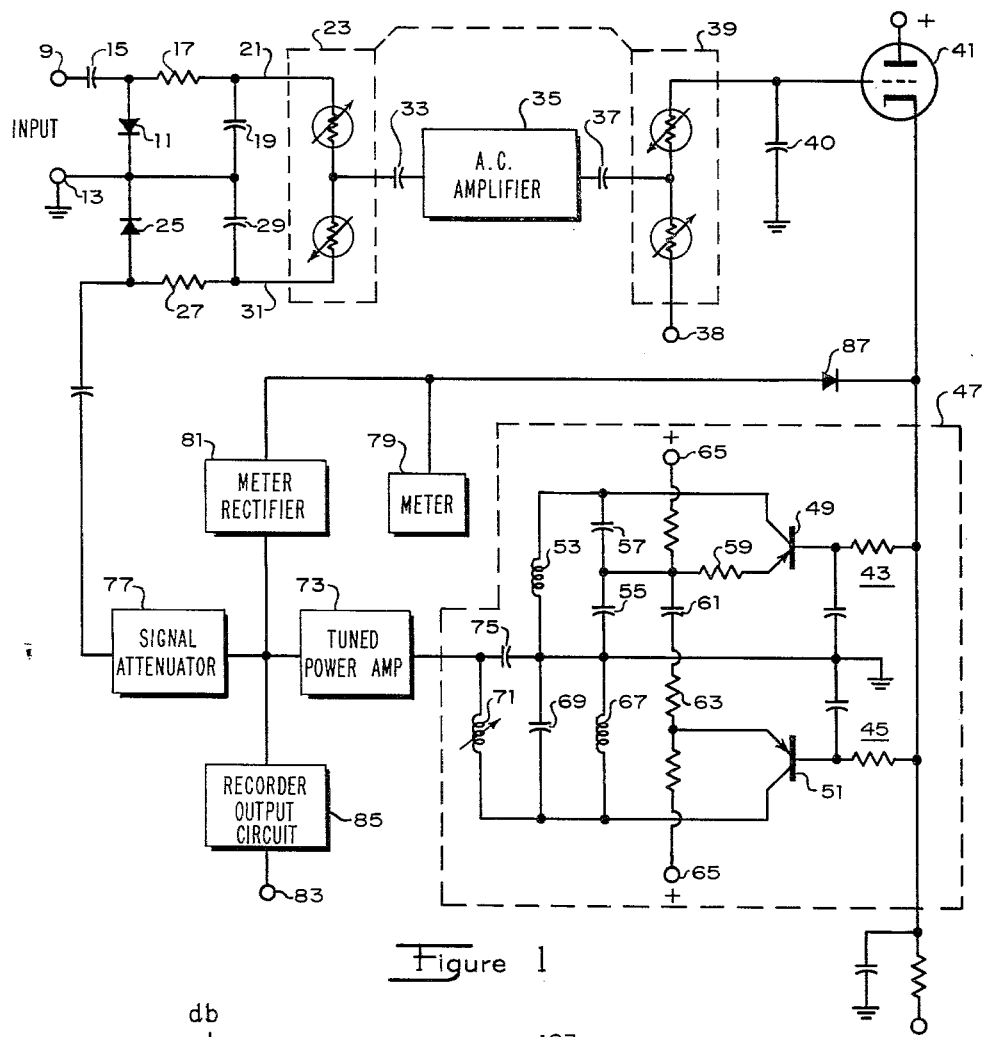

INVENTOR
DONALD E. NORGAARD

United States Patent Office

3,229,207
Patented Jan. 11, 1966

3,229,207
ELECTRONIC VOLTMETERS
Donald E. Norgaard, Los Altos, Calif., assignor to Hewlett-Packard Company, Palo Alto, Calif., a corporation of California
Filed Aug. 21, 1961, Ser. No. 132,911
4 Claims. (Cl. 324—119)

This invention relates to high frequency voltmeters and more particularly to a circuit for linearizing the relationship between the applied voltage and the resulting meter indication over the entire operating range of voltages.

Voltmeter circuits for measuring voltages at very high frequencies of the order of one kilomegacycle usually comprise means to develop a direct current voltage that is proportional to the amplitude of the waveform being measured. This type of operation uses relatively simple circuitry to produce an indication of the magnitude of the voltage under examination. The means to develop a direct current voltage which is proportional to the amplitude of the waveform under examination usually comprises a rectifying circuit contained within a probe. Thus the signal fed from the probe to the main portion of the instrument is an easily handled D.-C. signal instead of a high frequency signal.

High frequency voltmeter probes have been developed using thermionic diodes in a rectifying circuit contained within the body of the probe. The use of thermionic diodes, such as vacuum tube diodes, has many disadvantages. It is known that a vacuum tube diode develops a thermionic potential when no voltage is applied to its plate, this potential being dependent upon the temperature of the cathode. In order to obtain accurate information in the form of a D.-C. voltage that is proportional to the amplitude of the waveform under examination, it is necessary to compensate for the thermionic potential that appears as an increment of D.-C. voltage at the output of the rectifier circuit. It is possible to regulate the power supplied to the filament of the vacuum tube diode in order to maintain the temperature of the filament at a substantially constant value and by using a relatively stable bucking voltage it is possible to compensate for the mean value of thermionic potential which is generated. However, changes in ambient temperature, aging of the tube, and other factors have been found to produce drift of the order of two millivolts in the thermionic potential. It is therefore difficult to make accurate low level measurements of high frequency voltages using a thermionic diode.

A disadvantage encountered in making high frequency voltage measurements using a diode probe is that the rectification (i.e. the conversion of the applied A.-C. signal to a related D.-C. voltage) varies non-linearly with applied signal level. For this reason it is frequently necessary to provide an indicating meter with a non-linear scale that compensates for the rectification characteristic of the diode. A non-linear meter scale is generally calibrated for a particular diode and has more closely spaced graduation at one end of the scale. The accuracy of the meter is reduced, then, when the diode is replaced. In addition, it is difficult to obtain a reading on the portion of the scale that is compressed.

It is therefore an object of the present invention to provide a voltmeter circuit which is capable of obtaining accurate measurements of low level, high frequency voltages.

It is another object of the present invention to provide a voltmeter circuit which provides a linear relationship between the applied voltage and the resulting meter indication over the entire operating range of voltages.

It is still another object of the present invention to provide a voltmeter circuit which is relatively insensitive to variations in ambient temperature.

It is still another object of the present invention to provide a voltmeter circuit which uses unmatched diodes as signal detectors and feedback detectors.

In accordance with the illustrated embodiment of the present invention, an applied high-frequency signal is converted to a direct-current signal by a signal detector. The direct-current signal is amplified by a chopper modulator amplifier and is applied to a linear converter. This device produces a substantially constant frequency waveform having an amplitude that is related to the amplitude of an applied direct-current signal of positive polarity. The constant frequency signal is amplified and applied to an indicating meter through a meter rectifier circuit. The amplified constant frequency signal is also applied through a signal attenuator to a feedback detector, the output of which is compared with the output of the applied signal detector. Since the linear converter is only responsive to direct-current signals of positive polarity, another circuit path responsive to direct-current signals of negative polarity is provided to apply the signal appearing at the output of the chopper amplifier to the indicating meter. An indicating meter connected in this manner may not only be driven upscale in an accurate relationship to the applied signal, but may also be driven downscale where adjustments about the zero indication are required.

Figure 2:
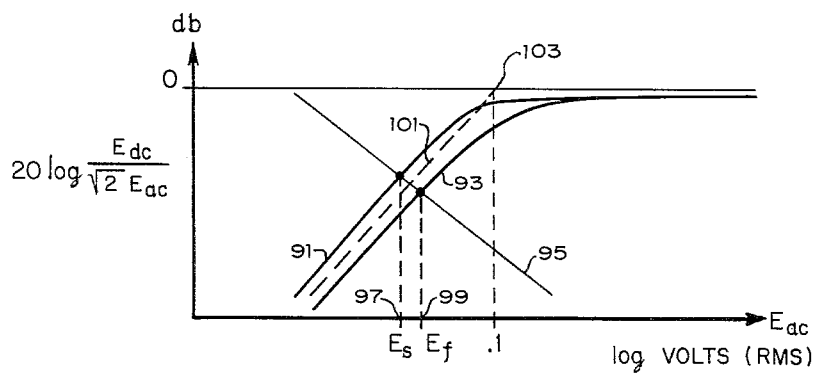

Other and incidental objects of the present invention will be apparent from a reading of this specification and an inspection of the accompanying drawing in which:

FIGURE 1 is a schematic diagram of a circuit according to the present invention, and FIGURE 2 is a graph showing the error relationship between the rectification characteristics of the signal detecting diode and the feedback detecting diode.

Referring now to FIGURE 1, signal detecting diode 11, contained within a probe for the voltmeter, is connected to input terminal 9 through capacitor 15 and to ground terminal 13. A low pass filter including resistor 17 and capacitor 19 is connected to apply the singal appearing across diode 11 to the input terminal 21 of chopper modulator 23. Diode 25, also contained within the voltmeter probe, is connected to the feedback path and to ground terminal 13. A low pass filter including resistor 27 and capacitor 29 is connected to apply the signal appearing across diode 25 to the other input terminal 31 of modulator 23. Capacitor 33 is connected between the input of a A.-C. amplifier 35 and the output of modulator 23. The output of amplifier 35 is connected through capacitor 37 to demodulator 39, the output of which is connected to the input of cathode follower 41. Terminal 38 of a voltage supply that is adjustable over a small range of values about zero potential is connected as a reference for demodulator 39. Capacitor 40 is connected between the output of demodulator 39 and ground. Filters 43 and 45 of linear converter 47 connect the output of cathode follower 41 and the base electrodes of transistors 49 and 51, respectively. The collector electrode of transistor 49 is connected to a tuned circuit including inductor 53 and serially connected capacitors 55 and 57. The common terminal of serially connected capacitors 55 and 57 is connected to the emitter electrode of transistor 49 through resistor 59, and is connected to the emitter electrode of transistor 51 through serially connected capacitor 61 and resistor 63. Direct current paths connecting power supply terminal 65 and the emitter electrodes of transistors 49 and 51 provide biasing current for each of the transistors. The collector electrode of transistor 51 is connected to the parallel combination of inductor 67 and capacitor 69 and to one terminal of variable inductor 71. The other terminal of variable inductor 71 is connected to tuned power amplifier 73 and to capacitor 75. The output of power amplifier 73 is connected to the feedback diode 25 through signal attenuator 77, to the indicating meter 79 through meter rectifier 81 and to recorder output terminal 83 through recorder output circuit 85. Indicating meter 79 is also connected to the output of cathode follower 41 through diode 87.

In operation, input terminals 9 and 13 of the voltmeter probe are connected to the circuit under examination. The high frequency voltage appearing at terminal 9 with respect to ground terminal 13 is applied to the rectifying diode 11 through coupling capacitor 15. The D.-C. voltage that is produced is filtered by the combination of resistor 17 and capacitor 19, and is applied to input terminal 21 of modulator 23. At lower levels of applied high frequency signal, diode 11 operates substantially in the square law region. At high levels of applied signal, the diode operates in the region of substantially linear relationship between the applied A.-C. signal and the resulting D.-C. voltage. Thus the voltage that appears at input terminal 21 is non-linearly related to the amplitude of the signal that is applied to input terminal 9.

The feedback voltage that is applied to diode 25 is converted to a D.-C. voltage which is filtered by a combination of resistor 27 and capacitor 29 and applied to input terminal 31 of modulator 23. For the reasons previously discussed in connection with the operation of diode 11, the voltage that appears at input terminal 31 is non-linearly related to the amplitude of the applied feedback voltage. Since diodes 11 and 25 are located in the probe and are operating at substantially the same ambient temperature, thermally generated voltages in each of the two diodes do not affect the difference between the voltage that appear at input terminals 21 and 31 of modulator 23.

Modulator 23 comprises a pair of light sensitive cells or photoconductive cells serially connected between input terminals 21 and 31, their common terminal being connected to the output terminal. The cells are alternately illuminated and darkened in opposite phase relationship by the action of a rotary shutter interposed between the cells and a light source. The cells show high conductivity in the illuminated state, and low conductivity in the darkened state. Other types of modulators, such as contact modulators, may be used. However, these contact modulators generally introduce unknown increments of noise voltage in the modulated output signal, which noise voltage may be appreciable for small signals. Thus the contact modulators are undesirable for operation at low levels of applied voltage.

The output signal of modulator 23 is substantially a square wave having an amplitude that is equal to the difference between the voltages appearing at its input terminals. This square-wave signal is amplified by A.-C. amplifier 35 and is demodulated by photoconductor demodulator 39. Since the thermally generated voltages in diodes 11 and 25 are added in equal increments to the voltages appearing at terminals 21 and 31, the difference remains unchanged and the output square wave remains unchanged for changes in ambient temperature. The construction of demodulator 39 is similar to the construction of modulator 23, both units being operated in synchronism by the same rotary shutter. The voltage at the output of demodulator 39 is filtered by capacitor 40 and is applied to the input of cathode follower 41.

The voltage that appears at the output of cathode follower 41 is proportional to the difference between the voltages applied to terminals 21 and 31 of modulator 23. The phase relationship between these voltages is such that a negative voltage at terminal 21 produces a positive voltage at the output of cathode follower 41. When the voltage at the output of cathode follower 41 is positive, diode 87 is back-biased. Linear converter 47, to be described in detail hereinafter, produces an oscillatory signal at a substantially constant frequency in response to applied D.-C. voltages of positive polarity. The amplitude of oscillations is substantially linearly related to the amplitude of the applied positive voltage. This oscillatory signal is amplified by tuned power amplifier 73, is rectified by meter rectifier 81, and is applied to indicating meter 79. The amplified signal is also applied to the feedback diode 25 through signal attenuator 77. A D.-C. voltage is provided at terminal 83 for use with such utilization circuits as graphic recorders, remote indicators, and the like. The D.-C. voltage at terminal 83 is produced by recorder output circuit 85 from the amplified signal appearing at the output of tuned power amplifier 73.

For high gain feedback loop, a small signal appearing at the output of cathode follower 41 means a very small difference in the voltages appearing at input terminals 21 and 31 of modulator 23. This establishes the relationship that the two D.-C. voltages at the input terminals are substantially equal, regardless of non-linearities in the circuit. Thus, the signal applied to indicating meter 79 is linearly related to the signal applied to input terminal 9.

When no signal is applied to the input terminal 9, it may be convenient to perform a meter adjustment about the zero indication. Voltage supply 38 may be varied to produce small variations about zero potential in the output voltage of cathode follower 41. When voltage supply 38 is adjusted to produce a positive voltage at the output of cathode follower 41, the indicating meter 79 is driven upscale in a manner that is similar to the operation of the circuit on an applied high frequency signal. Since the linear converter 47 is responsive only to voltages of positive polarity, diode 87 is provided to permit meter 79 to be driven downscale by the negative voltage. Thus a negative voltage at the output of cathode follower 41 simultaneously renders linear converter 47 non-operative and forward biases diode 87. Indicating meter 79 may thus be driven in the upscale direction and in the downscale direction about the zero indication by voltages of positive and negative polarity, respectively, appearing at the output of cathode follower 41.

Linear converter 47 includes transistor 49 in an oscillator circuit and transistor 51 in an amplifier circuit. When the voltage applied to the base terminal of transistor 49 is made sufficiently positive, the collector-base junction becomes so biased that the transistor is able to provide gain. The circuit connected to the collector electrode of transistor 49 resonates at a frequency that is determined by inductor 53 and serially connected capacitors 55 and 57. The serially connected capacitors operate as a voltage divider to apply a portion of the oscillatory voltage to the emitter electrode of the oscillator transistor. This oscillatory voltage is also applied to the emitter electrode of transistor 51. If the voltage applied to the base electrode of transistor 51 is positive with respect to the collector electrode, the signal is amplified and applied to the resonant circuit including variable inductor 71 and serially connected capacitors 69 and 75. Inductor 67 provides a direct-current path to ground for the current flowing in the collector electrode of transistor 51. Inductor 71 is adjusted to cause the circuit comprising capacitors 69 and 75 and inductors 67 and 71 to resonate at the frequency which is determined by the circuit comprising inductor 53 and capacitors 55 and 57. Capacitors 69 and 75 are so chosen that the voltage across the latter is many times larger than the voltage across the former. Thus, a positive D.-C. voltage of three volts when applied to linear converter 47 may produce as much as 30 volts of signal at a frequency of the order of 100 kilocycles at the input of tuned power amplifier 73.

Referring now to the graph of FIGURE 2, there is shown a plot 91 of the rectification characteristics of the input diode 11 and a plot 93 of the rectification characteristics of feedback diode 25. These plots are shown with dissimilar characteristics in the low level region to illustrate a desirable feature of the present invention. The scale on the ordinate axis of twenty times the common logarithm of the ratio of a resulting D.-C. voltage to the peak value of an applied A.-C. signal. The scale on the axis of abscissas is the common logarithm of root mean square values of A.-C voltage. Curve 95 is a plot on this logarithmic scale of a constant D.-C. voltage, which plot has a slope of minus twenty decibels per decade of applied A.-C. voltage. If a particular value of signal voltage 97 produces the constant D.-C. voltage plotted as curve 95, then for the given pair of diodes, a larger value of feedback signal 99 is required to develop the same constant D.-C. voltage 95. The asymptotic plot of the rectification characteristic of a typical diode is shown as curve 101, having a slope of twenty decibels per decade and having a projected average break point 103 at approximately 0.1 volt R.M.S of signal. At input signal levels above the projected average break point 103, the typical diode operates as a peak detector in the substantially linear rectification region wherein the ratio of the D.-C. voltage to the applied signal voltage on the ordinate axis is unity or zero decibels. It should be noted that the plots 91 and 93 for diodes 11 and 25, respectively, indicate that the difference in rectification efficiency for the pair of unmatched diodes 11 and 25 is largest in the square law region, i.e., in the region of applied A.-C. voltage values below the projected average break point 103. The error introduced by unmatched diodes 11 and 25 may be materially reduced by adjusting the attenuation ratio of signal attenuator 77 so that the indicating meter 79 reads low on the feedback signal 99 that is required to produce a D.-C. voltage at terminal 31 that is equal to the D.-C. voltage at terminal 21. This calibration adjustment has the effect of making curves 91 and 93 for the unmatched pair of diodes very nearly coincident in the region below the projected average break point 103. Thus, since the curves are coincident in the linear region above approximately 0.1 volt R.M.S. of signal, and are made coincident below this value in the square law region by an adjustment of the signal attenuation ratio, the error remaining occurs only in the region of values about the region of the projected average break point 103 and is thus negligibly small.

It should be noted that the voltmeter circuit of the present invention may be used to measure high frequency signals at signal levels below 0.1 volt. This circuit provides a linear meter indication of the applied signal amplitude despite the non-linear rectification characteristics of the signal detecting diode. In addition, since the signal detecting diode and the feedback detecting diode are operated at substantially the same ambient temperature, the accuracy of the voltmeter of the present invention is not materially decreased by changes in the ambient temperature. Further, the accuracy of the voltmeter circuit of the present invention may be restored after a change of one or both of the detector diodes by making a simple calibration adjustment of the feedback signal attenuation ratio.

I claim:

1. A voltmeter circuit for measuring a high frequency electrical signal, said circuit comprising a first rectifying circuit to produce a first D.-C. voltage that is related to the amplitude of said signal, a linear converter responsive to voltages of positive polarity to produce an output signal of substantially constant frequency having an amplitude that is related to the amplitude of the voltage applied thereto, indicating means, means including an amplifier tuned to said constant frequency to apply said output signal to the indicating means, whereby an indication that is proportional to the amplitude of said output signal is produced, a second rectifying circuit, a signal attenuator connected to apply said output signal to the second rectifying circuit, said second rectifying circuit producing a second D.-C. voltage that is related to the amplitude of said output signal, means to produce an eror signal that is equal to the difference between the first and second D.-C. voltages, amplifying means connected to receive said error signal and to produce a third D.-C. voltage that is related to the amplitude of said error signal, means to apply the third voltage to the linear converter, a unilateral conduction element to apply to said indicating means the third voltage when the polarity thereof is negative, a source of adjustable reference voltage, and means to vary the third voltage in response to an adjustment of said reference voltage.

2. A voltmeter circuit for measuring a high frequency electrical signal, said circuit comprising a first rectifying circuit to produce a first D.-C. voltage that is related to the amplitude of said signal, a linear converter responsive to voltages of positive polarity to produce an output signal of substantially constant frequency having an amplitude that is related to the amplitude of the voltage applied thereto, indicating means, means including an amplifier tuned to said constant frequency to apply said output signal to the indicating means, whereby an indication that is proportional to the amplitude of said output signal is produced, a second rectifying circuit adapted to operate at the ambient temperature of the first rectifying circuit, a signal attenuator connected to apply an adjustable portion of said output signal to the second rectifying circuit, the second rectifying circuit producing a second D.-C. voltage that is related to the amplitude of the portion of said output signal applied thereto, a chopper modulator to produce an error signal that is equal to the difference between the first and second voltages, amplifying means connected to receive said error signal, a demodulator operating in synchronism with said modulator, means including said demodulator and amplifying means to produce a third D.-C. voltage that is related to the amplitude of said error signal, means to apply the third voltage to the linear converter, a unilateral conduction element to apply to said indicating means the third voltage when the polarity thereof is negative, a source of reference voltage that is positively and negatively adjustable about zero potential, and means to vary the third voltage in response to an adjustment of said reference voltage.

3. A voltmeter circuit for measuring a high frequency electrical signal, said circuit comprising a first rectifying circuit to produce a first D.-C. voltage that is related to the amplitude of said signal, a linear converter responsive to voltages of positive polarity to produce an output signal of substantially constant frequency having an amplitude that is related to the amplitude of the voltage applied thereto, indicating means, means including a power amplifier tuned to said constant frequency to apply said output signal to the indicating means, whereby an indication that is proportional to the amplitude of said output signal is produced, a second rectifying circuit operating at the ambient temperature of the first rectifying circuit, a signal attenuator connected to apply an adjustable portion of said output signal to the second rectifying circuit, said second rectifying circuit producing a second D.-C. voltage that is related to the amplitude of the portion of said output signal applied thereto, a photoconductor modulator having one output and two input terminals, means to apply the first D.-C. voltage to one input terminal, means to apply the second D.-C. voltage to the other of said input terminals, signal amplifying means connected to receive the output of said modulator, a demodulator operating in synchronism with said modulator, means including said signal amplifying means and said demodulator to produce a third D.-C. voltage that is related to the difference between said first and second D.-C. voltages, means to apply the third voltage to the linear converter, a unilateral conduction element to apply to said indicating means the third voltage when the polarity thereof is negative, a source of reference voltage that is positively and negatively adjustable about zero potential, and means to vary the third voltage in response to an adjustment of said reference voltage.

4. A voltmeter circuit for measuring a high frequency electrical signal, said circuit comprising a first rectifying circuit to produce a D.-C. voltage that is related to the amplitude of said signal, an oscillator circuit responsive to voltages of positive polarity to produce a substantially constant frequency signal having an amplitude that is related to the amplitude of the voltage applied thereto, an amplifier circuit to receive said constant frequency signal and being so designed that the amplification of said constant frequency signal is related to the amplitude of an applied positive biasing voltage, a filter tuned to said constant frequency connected to the output of said amplifier circuit and being adapted to provide an output signal containing predominantly the fundamental of said constant frequency, indicating means, means including a power amplifier tuned to said constant frequency to apply said output signal to the indicating means, whereby an indication that is proportional to the amplitude of the fundamental of said constant frequency output signal is produced, a second rectifying circuit operating at the ambient temperature of the first rectifying circuit, a signal attenuator connected to apply an adjustable portion of said output signal to the second rectifying circuit, said second rectifying circuit producing a second D.-C. voltage that is related to the amplitude of the portion of said output signal applied thereto, a modulator having serially connected photoresponsive elements which are alternately illuminated and darkened in opposite phase relationship at a predetermined rate, means to apply the first and second D.-C. voltages to said modulator, said modulator being adapted to produce an error signal that is equal to the difference between the applied first and second voltages, signal amplifying means connected to receive said error signal, a demodulator operating in synchronism with said predetermined rate, means including said signal amplifying means and said demodulator to produce a third D.-C. voltage that is related to the amplitude of said error signal, means to apply the third voltage to the oscillator circuit and to the amplifier circuit, a unilateral conduction element to apply to said indicating means the third voltage when the polarity thereof is negative, a source of reference voltage that is positively and negatively adjustable about zero potential, and means to vary the third voltage in response to an adjustment of said reference voltage.

References Cited by the Examiner
UNITED STATES PATENTS

| | | | |
|---|---|---|---|
| 2,511,562 | 6/1950 | Bresee | 324—119 |
| 2,724,800 | 11/1955 | Hansen | 324—95 |
| 2,857,569 | 10/1958 | Gilbert | 324—106 |
| 3,004,220 | 10/1961 | Williamson | 324—132 |
| 3,064,193 | 11/1962 | Grubb | 324—120 |

WALTER L. CARLSON, *Primary Examiner.*

FREDERICK M. STRADER, *Examiner.*

R.V. ROLINEC, *Assistant Examiner.*